United States Patent [19]

Wolejsza, Jr. et al.

[11] 3,736,507

[45] May 29, 1973

[54] PHASE AMBIGUITY RESOLUTION FOR FOUR PHASE PSK COMMUNICATIONS SYSTEMS

[75] Inventors: Chester J. Wolejsza, Jr.; Eugene R. Cacciamani, Jr., both of Rockville, Md.

[73] Assignee: Communications Satellite Corporation, Washington, D.C.

[22] Filed: Aug. 19, 1971

[21] Appl. No.: 173,191

[52] U.S. Cl. ....................325/30, 178/67, 179/15 BS, 325/60

[51] Int. Cl. ....................H04j 1/20

[58] Field of Search ....................178/66, 67; 179/15 BC, 15 BT, 15 AN; 325/60, 38 R, 39, 40, 41, 42, 65; 343/200

[56] References Cited

UNITED STATES PATENTS

| | | | |
|---|---|---|---|
| 3,289,082 | 11/1966 | Shumate | 178/66 |
| 3,134,855 | 5/1964 | Chasek | 179/15 BC |
| 3,614,623 | 10/1971 | McAuliffe | 325/65 X |

*Primary Examiner*—Benedict V. Safourek
*Attorney*—Richard C. Sughrue, Gideon Franklin Rothwell, John H. Mion et al.

[57] ABSTRACT

In a four phase PSK modulation/demodulation communications link phase ambiguity is resolved. At the transmitter a separate unique word modulates each of the phase quadrature components of the carrier frequency. At the receive end of the link, if the recovered carrier is locked onto the 0° phase of the received signal the two unique words will appear correctly in respective quadrature channels. However, if the recovered coherent carrier locks onto the wrong phase of the received carrier any combination of the following errors will occur: the unique words will appear in the wrong channels, the unique word in the first channel will be inverted, the unique word in the second channel will be inverted. Also the data will be garbled. The unique words, or their complements, are detected in the quadrature channels, and the channel outputs are altered, e.g., inverted or reversed, to result in the correct unique word appearing correctly at the outputs of the quadrature channels. The correction of the unique word results in an ungarbling of the data bits at the receiver.

11 Claims, 18 Drawing Figures

INVENTORS
EUGENE R. CACCIAMANI, JR
CHESTER J. WOLEJSZA, JR.

BY Sughrue, Rothwell, Mion, Zinn & Macpeak
ATTORNEYS

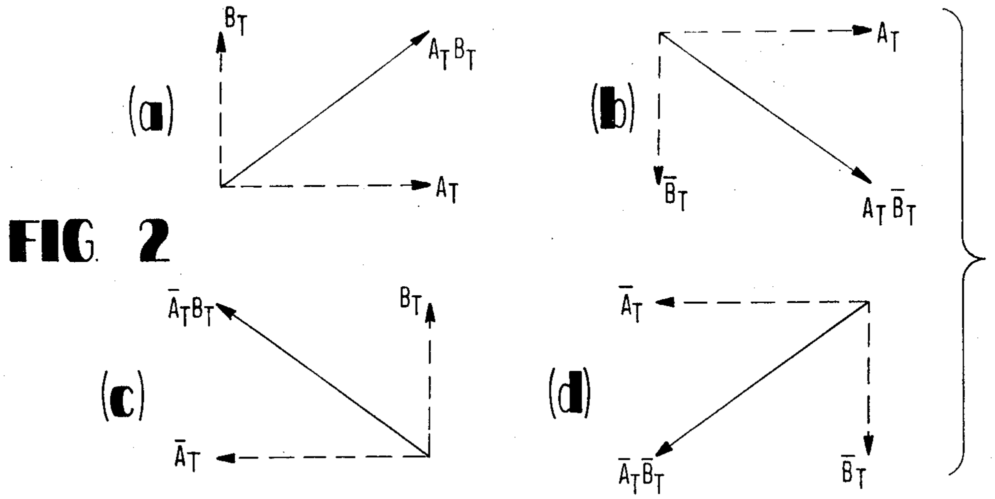
FIG. 2
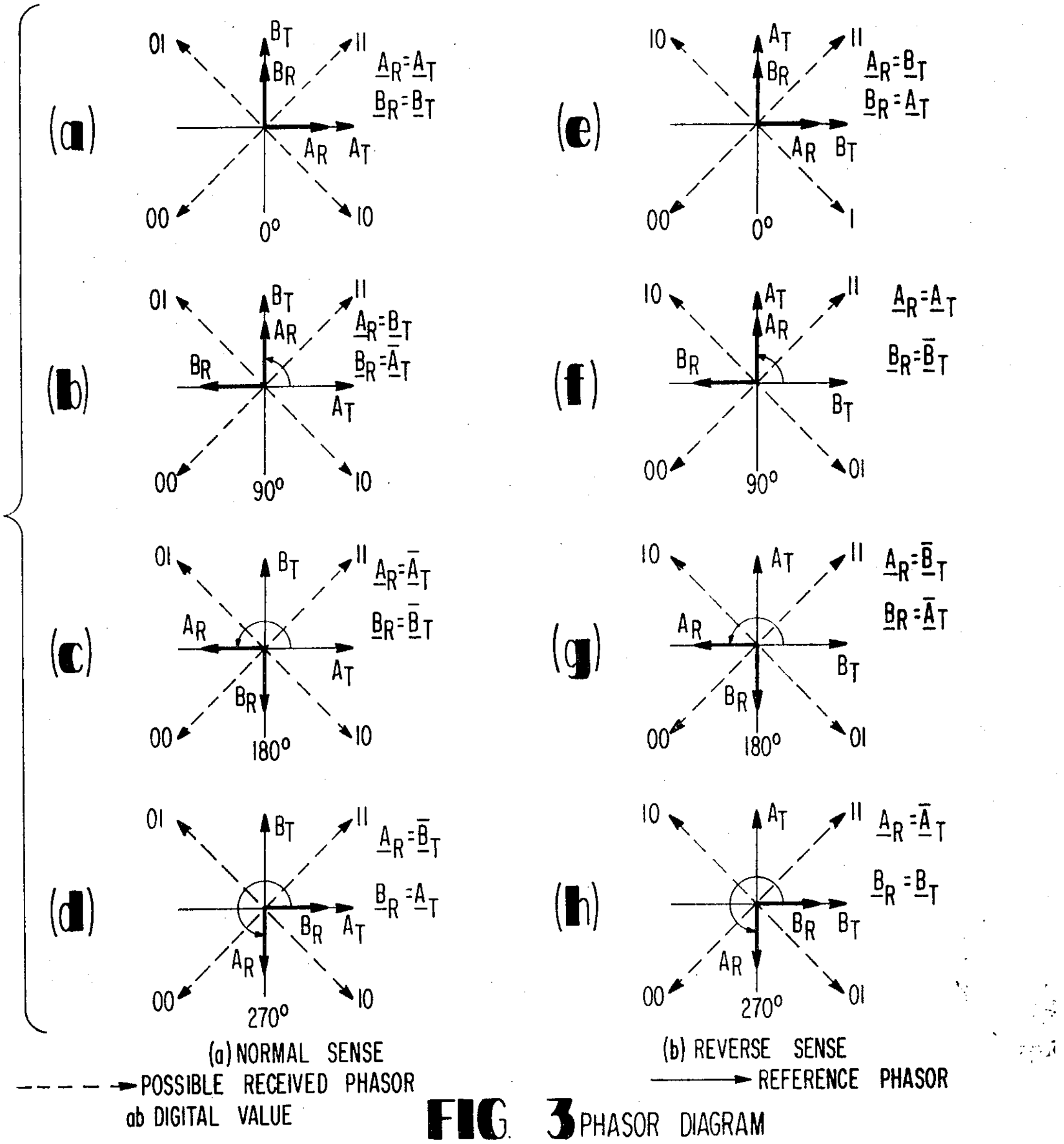
FIG. 3 PHASOR DIAGRAM

PHASE AMBIGUITY RESOLUTION FOR FOUR PHASE PSK COMMUNICATIONS SYSTEMS

BACKGROUND OF THE INVENTION

The invention is in the field of PSK modulation/-demodulation communications links and in particular is directed to a method and apparatus for resolving ambiguity in four phase PSK systems resulting from the carrier recovery circuits at the receive end of the link locking onto a phase other than the reference phase of the received carrier.

In PSK systems digital data modulates a carrier by controlling its phase in discrete steps. For example, in a two-phase PSK system, data represented by the binary notations zero and one modulate the carrier and are represented by the 0° and 180° phases, respectively, of the carrier. In a four phase PSK system four separate phases, 0°, 90°, 180°, 270°, of the carrier are used and thus each phase represents a pair of serially occurring binary digits, or the simultaneously occurring digits in two parallel channels At the receive end a coherent carrier is recovered from the modulated carrier and is used to detect the relative phase of the received carrier and concomitantly the digit or digits represented thereby.

One of the problems occurring in PSK systems is that of phase ambiguity at the receiver. This is due to the inability of the carrier recovery circuit to distinguish the reference phase from the other phase or phases of the received carrier. For example, in a two phase PSK system if the carrier recovery circuits lock onto the 180° phase rather than the 0° or reference phase of the received carrier, the detected data will be inverted relative to the data which originally modulated the carrier at the transmitter. One technique known to resolve phase ambiguity in a two phase PSK system is to modulate a unique word onto the carrier at the transmitter and detect whether the unique word is in the true or complement form at the receiver. If the complement of the unique word appears at the receiver, the problem can be corrected by inverting the data in the data channel.

In four phase PSK modulation the problem of phase ambiguity results in the data being garbeled and a solution comparable to that used in two phase PSK systems is not readily apparent. One technique presently used for resolving ambiguity is accomplished by differential encoding at the transmitter and subsequent differential decoding at the receiver following coherent demodulation. The disadvantages of this latter known method of ambiguity resolution is that it results in a degradation in bit error rate performance and it introduces multiple bit errors in the received data. Further, the differential encoding/decoding technique is especially undesirable because it makes data coding techniques more complex.

SUMMARY OF THE INVENTION

In accordance with the present invention it has been discovered that each of eight possible ambiguous phase conditions in the recovered carrier of a four phase PSK system uniquely affects the data in the two parallel channels (hereinafter referred to as the quadrature channels) of the PSK demodulator. It turns out that any of the following errors or combinations of the following errors wlll occur in the quadrature channels of the receiver as a result of phase ambiguity. The date in either or both of the quadrature channels may be inverted with respect to the transmitted data; the data in the two quadrature channels may be reversed, i.e., the data in the first channel should appear in the second channel and the data in the second channel should appear in the first channel for the combined outputs to correspond to the transmitted data. There are eight possible combinations of the three possible errors mentioned above and each combination uniquely identifies the phaee ambiguity. In practice, it is not important to identify the phase of the recovered coherent carrier which caused the errors since the preferred solution is to simply correct the errors at the outputs of the channels. The condition in each of the channels is monitored by detecting the true or complement of two unique words which are separately modulated onto the two quadrature channels at the transmitter.

BRIEF DESCRIPTION OF DRAWINGS

FIGS. 2*a* through 2*d* are phasor diagrams illustrating the formation of a quadraphase modulated carrier as is conventional in foru phase PSK modulators.

FIGS. 3*a* through 3*h* are phasor diagrams illustrating the possible phase relations between transmitted and received quadrature channels as a result of phase ambiguity errors.

DETAILED DESCRIPTION

In a 4$\phi$ PSK communications link of a known type, two channels of data modulate phase quadrature components of a carrier wave resulting in two biphase modulated carriers. The two biphase modulated carriers are linearly added resulting in a single quadraphase modulated carrier. The output carrier has a constant phase over each period corresponding to the bit time of the two data channels, and the particular phase signifies the data bit identity in both channels. The four possible phases of the quadraphase modulated carrier represent, respectively, the binary data bit combinations, 00,01,10, and 11; where the first bit represents the data bit in the A channel and the second bit represents the data in the B channel.

Typically the two channels of data are obtained from a single channel, $D_T$, of serial data. The serial train in channel D is applied to a serial to parallel convertor which diverts alternate $D_T$ bits to the A and B channels respectively and double the bit period.

Figure 1A:
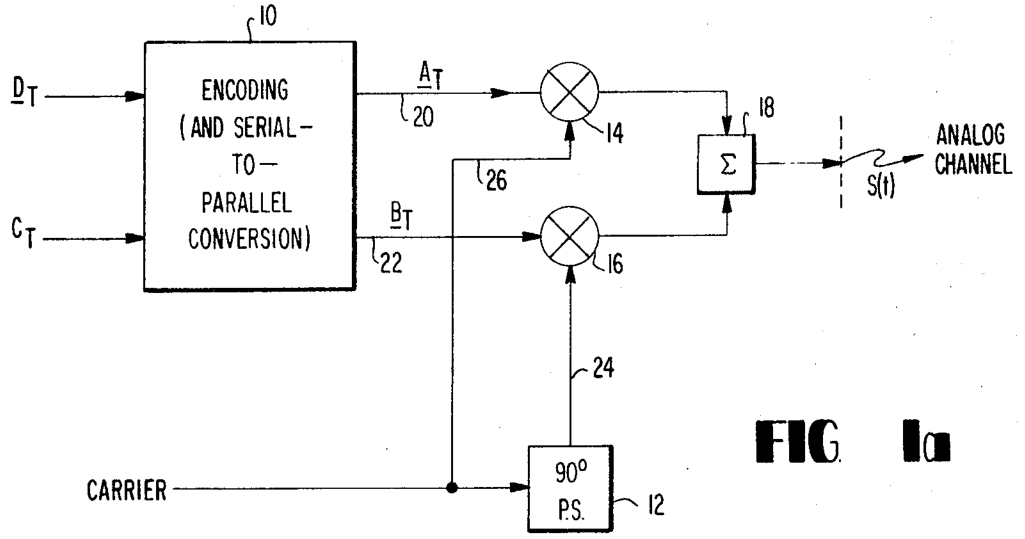
FIGS. 1*a* and 1*b* are block diagram illustrations of a prior art four phase PSK modulator/demodulator.

An example of a quadraphase modulator of the type discussed is illustrated in FIG. 1*a*, wherein $D_T$ represents the data train, $C_T$ the clock pulse, and $A_T$ and $B_T$, the respective data trains in the quadrature channels A and B. The clock pulses $C_T$ and data train $D_T$ are applied to a conventional serial to parallel converter 10 to produce the data trains $A_T$ and $B_T$ wherein $A_{T(i)} = D_{T(i)}$, $i = 1, 3, 5, 7, \ldots$; and $B_{T(i)} = D_{(i+1)}$, and wherein the bit period of the $A_T$ and $B_T$ data trains is twice that of $D_T$.

A pair of balanced modulators 14 and 16 are provided in the respective quadrature channels for modulating carriers applied thereto with the $A_T$ and $B_T$ data respectively. A carrier wave of suitable frequency is applied to both modulators 14 and 16, but due to the phase shift of a 90° phase shifter 12, the carrier applied to modulator 16 phase - leads the carrier applied to modulator 14 by 90°. The output of each modulator is a biphase modulator carrier, modulated with the respective data $A_T$ and $B_T$. The biphase modulated carriers are in phase quadrature relation to each other and are summed in a linear adding means 18. The output from adding means 19 is quadraphase modulated carrier whose phase is dependent upon the $A_T$ and $B_T$ data simultaneously.

The phase relation between the biphase modulated carriers and the quadraphase modulated carrier is illustrated by the phasor diagrams in FIG. 2*a* through 2*d*. Considering the carrier applied to modulator 14 as the referencce or 0° phase, the modulated carrier at the output will be at 0° or 180° with respect to the reference depending on whether $A_T = 1$ or $A_T = 0$ (also symbolized respectively as $A_T$ and $\bar{A}_T$). The output carrier from modulator 18 will be either −90° or +90° (−270°) with respect to the reference.

FIGS. 2*a* through 2*d* illustrate the four possible phase conditions of the biphase signals, corresponding respectively to $A_T B_T$, $A_T\bar{B}_T$, $\bar{A}_T B_T$, and $\bar{A}_T\bar{B}_T$, and the resultant phases of the quadraphase modulated carrier.

Figure 1B:
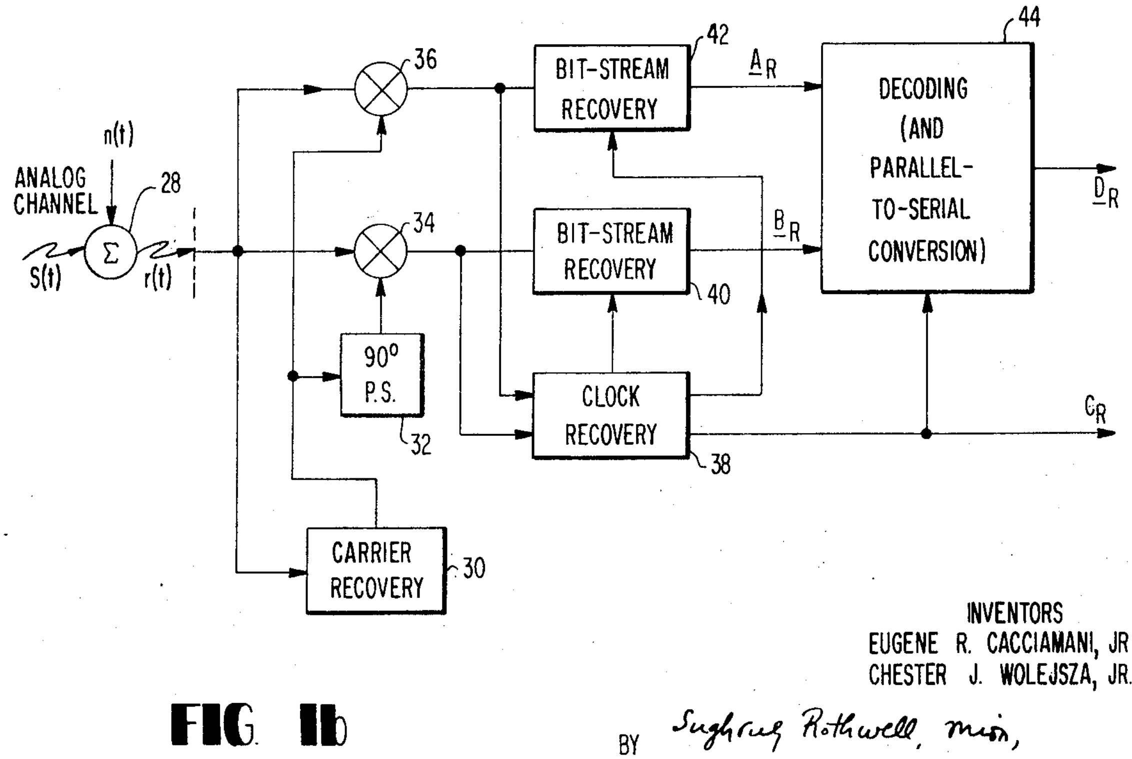

The quadraphase modulated carrier is then transmitted via any suitable transmission medium to a demodulator which reverses the operation of the modulator and generates an output train $D_R \approx D_T$. The inexact equality is due to noise in the transmission medium. A conventional decoder is illustrated in FIG. 1*b* and includes, balanced demodulators 34 and 36, carrier recovery circuit 30, clock recovery circuit 38, bit stream recovery circuits 40 and 42, and decoder and parallel to serial convertor 44. The introduction of noise due to the transmission path is illustrated generally at 28. The circuit elements shown operate in known manner to generate $A_R \approx A_T$ and $B_R \approx B_T$ provided the carrier recovery circuits are locked on the reference phase of the received carrier. However, since the received carrier has four possible phases, relative to the reference phase, the carrier recovery circuit can lock on any of the four phases. This phase ambiguity in the demodulator causes the data to be apparently imcomprehensibly garbeled.

The effect of an incorrect recovered - carrier phase on the demodulated data may be seen in the phasor diagrams in FIGS. 3*a* – 3*h*. It is necessary to consider two possible cases because the IF portion of the channel may or may not cause a phase - sense reversal (i.e., whereas $A_T$ is transmitted lagging $B_T$, $A_R$ may be received leading $B_R$. FIGS. 3*a* – 3*d* show normal sense, and FIGS. 3*e* – 3*h* show the reverse sense. Each of these senses has four possible states corresponding to each possible equilibrium phase of the recovered carrier.

The relation between the transmitted channels and receive channels can be obtained by comparing the $A_T$ and $B_T$ reference phasors with the $A_R$ and $B_R$ reference phasors. For example, consider the case of FIG. 3*b* which represents the normal sense relation between $A_T$ and $B_T$ and a recovered carrier phase of +90° with respect to the transmit reference. In that state, the $A_R$ reference phase is in the same direction as the $B_T$ reference phase, while the $B_R$ reference phase is opposite to the $A_T$ reference phase. Hence, after demodulation, $A_R = B_T$ and $B_R = \bar{A}_T$. Similarly, the relation between $A_T$, $B_T$ and $A_R$, $B_R$ can be found for each state, as summarized in Table I below.

TABLE I

Demodulator States

| Carrier Phase | State | Normal Sense | | State | Reverse Sense | |
|---|---|---|---|---|---|---|
| | | $A_T$ | $B_T$ | | $A_T$ | $B_T$ |
| 0° | 3*a* | $A_R$ | $B_R$ | 3*e* | $B_R$ | $A_R$ |
| 90° | 3*b* | $\bar{B}_R$ | $A_R$ | 3*f* | $A_R$ | $\bar{B}_R$ |
| 180° | 3*c* | $\bar{A}_R$ | $\bar{B}_R$ | 3*g* | $\bar{B}_R$ | $\bar{A}_R$ |
| 270° | 3*d* | $B_R$ | $A_R$ | 3*h* | $\bar{A}_R$ | $\bar{B}_R$ |

Translating tne above relationships into the effects they create on the demodulated data in the quadrature channels, it can be seen that there are only three errors caused by phase ambiguity, and that the eight possible states cause eight unique combinations of the three errors to occur.

The three errors are:

1. The date in the A channel is in complement form - represented by;

$$A_R = \bar{A}_T \text{ or}$$

$$A_R = \bar{B}_T.$$

2. The data in the B channel is in complement form - represented by;

$$B_R = \bar{B}_T \text{ or}$$

$$B_R = \bar{A}_T.$$

3. The data in the A and B channels are reversed - represented by;

$$A_R = B_T \text{ or } A_R = \bar{B}_T, \text{ and}$$

$$B_R = A_T \text{ or } B_R = \bar{A}_T.$$

The classification of the apparent incomprehensible garbling due to phase ambiguity into three definable errors allows the concept of unique word detection, heretofore applicable only to two-phase PSK, to be applicable to four-phase PSK. The resolution of phase ambiguity is accomplished by periodically modulating the carriers in the transmit guadrature channels by respective unique words $A_u$ and $B_u$, and monitoring the quadrature channels in the receiver for $A_u \bar{A}_u$, $B_u$ and $\bar{B}_u$. If $A_u$ or $\bar{A}_u$ is detected in the B channel, this indicates that the data in the channels is reversed. The error can be corrected by reversing the channel outputs prior to serailizing the data into $D_R$. It will be apparent that the latter error is also indicated by the detection of $B_u$ or $\bar{B}_u$ in the A channel. If $\bar{A}_u$ or $\bar{B}_u$ is detected in the A channel, this indicates that the data in the A channel is in complement or inverted form. It can be corrected by inverting the data in the A channel. Also, if $\bar{A}_u$ or $\bar{B}_u$ is detected in the B channel, this indicates that the data in that channel should be inverted. It will be noted that since any combination of the errors may exist, any combination of the corrections may be necessary. For example, if $\bar{A}_u$ is detected in the B channel and $\bar{B}_u$ is detected in the A channel, the data in both channels should be inverted and then reversed.

Figure 4A:
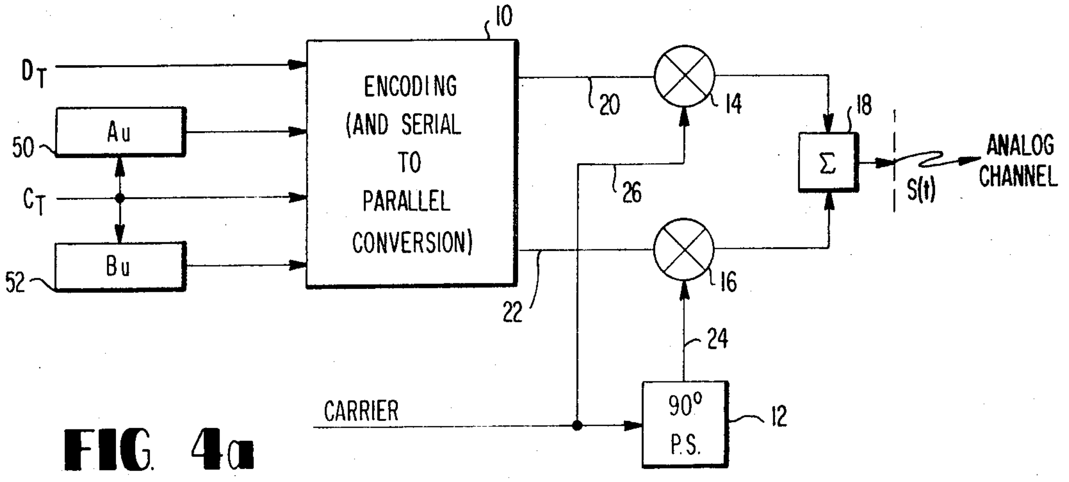
FIGS. 4*a* and 4*b* are block diagrams of a four phase PSK modulator/demodulator with phase ambiguity correction in accordance with the teachings of the present invention.
Figure 4B:
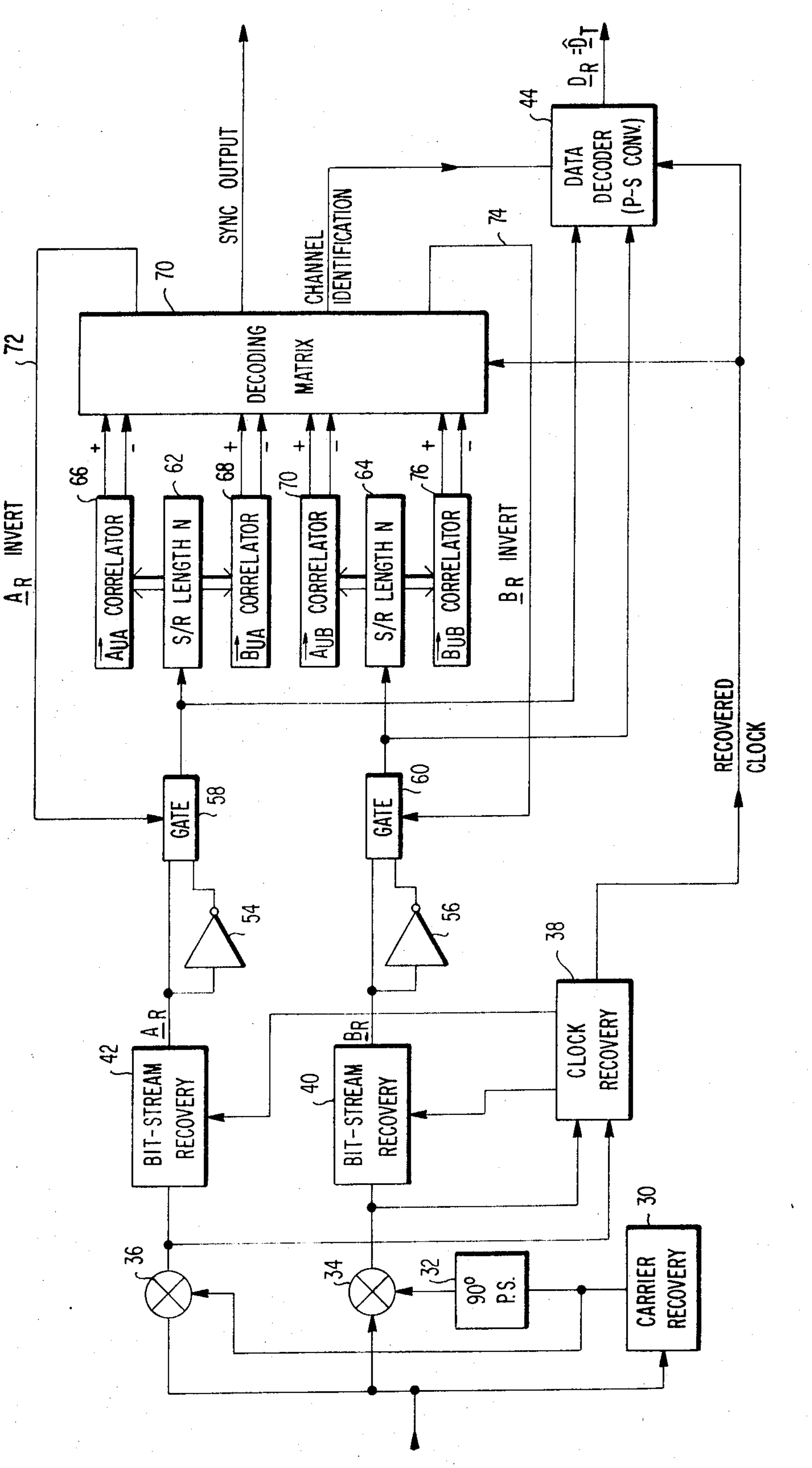

A generalized block diagram of the modulator and demodulator with phase ambiguity correction is shown in FIGS. 4*a* and 4*b*. The correction logic is added to the conventional modulator-demodulator circuitry of FIGS. 1*a* and 1*b*. As shown in FIG. 4*a* the only addition to the modulator is means 50, 52 for inserting the unique words $A_u$ and $B_u$ into the quadrature channels 20 and 22. The means are shown as two unique word generators which are periodically clocked by $C_T$ into the data trains $A_T$ and $B_T$ respectively. The unique words may be generated by a single generator $D_u$ which generates a serial word of length 2N which comprises $A_u$ and $B_u$, interlaced, - each of the latter being of length N. The unique words may serve the conventional synchronizing function as well as serving the ambiguity correction function desribed herein. Thus the unique words will preferrably be inserted in a conventional manner, between the bit timing information and the encoded voice data for the purpose of signaling the start of voice encoded data in a burst communication system of known type. Whatever the well known manner of generating $A_u$ and $B_u$, the system is controlled to insure that $A_u$ modulates the carrier in the A channel and $B_u$ modulates the data in the B channel.

At the receiver, as shown in FIGS. 4b, the added logic comprises, invertors 54, 56, gating means 58, 60, shift registers 62 and 64, $A_u$ correlators 66, 70, $B_u$ correlators 68, 76 and decoding matrix 70. The data decoder 44 is the same as in FIG. 1*b* with the single exception that it incorporates means for reversing the order in which the input data $A_R$, $B_R$ is serialized. In operation, the $A_R$ and $B_R$ data trains are fed through gating means 58 and 60 respectively to shift registers 62 and 64. Each of the gating means 58 and 60 is adapted to pass the data directly or after inversion, by invertors 54 and 56, to the shift registers. Control of gating means 58 and 60 is accomplished via control lines 72 and 74 respectively. The output data trains from gates 58 and 60 are also fed to the decoder 44 wherein they are serialized and decoded.

Each of the shift registers is of length N, where N is the length of each of the unique words $A_u$ and $B_u$. The shift register 62 is in the A channel and its contents is monitored by the correlators 66 and 68. If the unique word $A_u$ or its complement, $\bar{A}_u$, is detected by correlator 66, a logic output will be generated on the + or − line, respectively. The correlator will provide a zero output when neither $A_u$ nor $\bar{A}_u$ is detected. Correlatore 68 operates in the same way as correlator 66 except that it detects $B_u$ and $\bar{B}_u$. Shift register 64 and correlators 70 and 76 operate in the same manner in the B channel.

The decoding matrix 72 responds to the logic signals at the correlator outputs to generate the invert and reverse control signals. The channel A invert control signal appears on line 72 and changes the state of gating means 58 to effectively invert the data train appearing at the output of the gating means. The control signal will appear on line 72 whenever a logic signal appears on the minus (−) output of correlator 66 or 68, i.e., control singal 72 = $A_{uA}^- + B_{uA}^-$. A control signal on line 74 controls the state of gating means 60 in a similar manner; control signal 74 = $A_{uB}^- + B_{uB}^-$.

The control signal on the channel identification line controls the order of combination of $A_R$ and $B_R$ in decoding means 44. The latter control signal indicates reversal under the following input conditions to the decoding matrix:

$(B_{uA}^+ + B_{uA}^-)(A_{uB}^- + A_{uB}^-)$. Simple AND/OR logic for implementing the decoding matrix is apparent and therefore not illustrated in the drawings.

Figure 5:
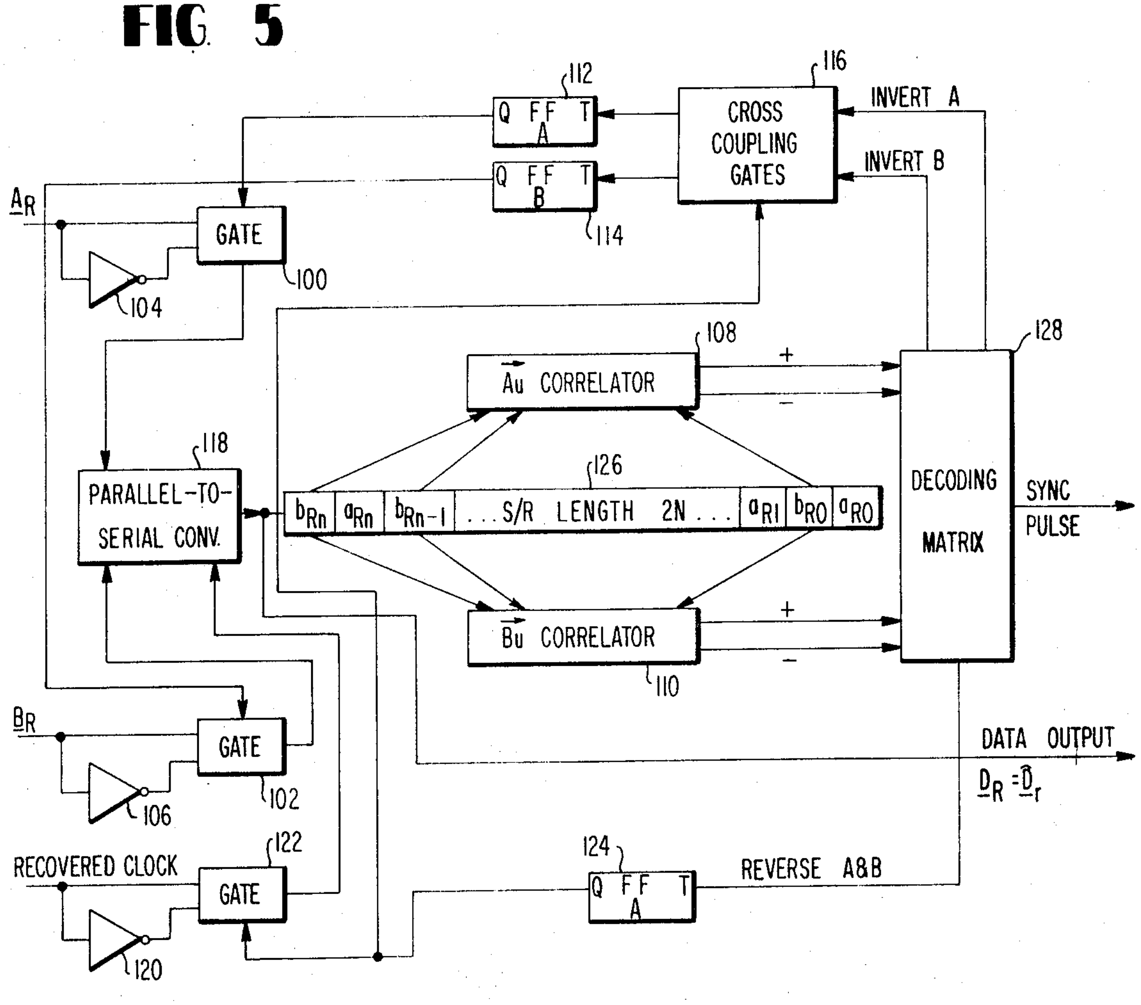
FIG. 5 is a block diagram of an alternate phase ambiguity correction system.

From the above description it can be appreciated that the cause of the phase ambiguity, e.g., carrier recovery circuit locking on the wrong phase or phase sense reversal, is not corrected. This is so because it is simpler to correct the errors in the data channels resulting from the aforesaid phase ambiguity. The block diagram of FIG. 4 shows a generalized form of logic for performing the correction. However, a preferred form of correction logic, in which the number of correlators needed is reduced by half, is illustrated in FIG. 5.

In the embodiment described in connection with FIG. 5, the data in the A and B channels are combined prior to detecting the unique words $A_u$, $B_u$ and their complements $\bar{A}_u$ and $\bar{B}_u$. This technique enables the elemination of one $A_u$ correlator and one $B_u$ correlator. The conventional demodulation circuitry is not illustrated but it will be apparent that the $A_R$ and $B_R$ data trains as well as the received clock, are all recovered by such conventional demodulation circuitry. The illustrated correction logic comprises, invertors 104, 106 and 120, gating means 100, 102 and 122, flip-flop circuits 112, 114 and 124, parallel to serial convertor 118, cross coupling gates 116, shift register 126, decoding matrix 128, $A_u$ correlator 109, and $B_u$ correlator 110.

Under nominal operating conditions the $A_R$ data train passes through gating means 100 and is applied to convertor 118. Also the $B_R$ data train and recovered clock pass through gating means 102 and 122, respectively, and are applied to convertor 118. The parallel bits in the $A_R$ and $B_R$ data train are serialized into an output data train $D_R$ in which the $A_R$ bit preceeds the $B_R$ bit.

The output data train is also applied to the shift register 126 which has 2N stages. If $D_R \approx D_T$ then at some time, $t_0$the shift register will be fully loaded with $A_u$ and $B_u$ interlaced, as shown in the drawings. The stages of correlators 108 and 110 are connected to every other stage of shift register 126 so that at time $t_0$, (still assuming $D_R = D_T$) the correlator 110 will provide a logic output ($B_u$) on the plus (+) output line. A time $t_{-1}$, which is one bit time prior to $t_0$, the correlator 108 will detect the $A_u$ unique word and generate a logic output ($A_u$) on the plus (+) output line.

When phase ambiguity errors occur the sequence of unique word detection will be different than $A_u$ followed one bit time later by $B_u$. If the data trains are reversed, the $B_u$ correlator 110 will detect $B_u$ or $\bar{B}_u$ prior to the $A_u$ correlator 108 detecting $A_u$ or $\bar{A}_u$. If the A channel data is inverted the correlator 108 will generate the logic output $\bar{A}_u$. If the B channel data is inverted, the correlator 110 will generate the logic output $\bar{B}_u$. .

The decoding matrix 128 responds to the logic inputs $A_u$, $\bar{A}_u$, $B_u$ and $\bar{B}_u$, and their relative times of occurrence to generate any of the three control signals (INVERT A, INVERT B, and REVERSE A & B,) needed for correction. The REVERSE A & B control signal toggles flip-flop 124 causing a change in state of gating means 122. The output of the gating means 122 now becomes the inverted received clock, and when applied to the parallel to serial convertor 118, causes the parallel bits to be serialized in reverse order. This accomplishes reversal of the data in the two channels.

The INVERT A and INVERT B control signals nominally pass through cross coupling gates 116 and toggle flip-flops 112 and 114, respectively. The outputs from the latter flip-flops control the states of gating means 100 and 102, respectively to control the application of $A_R$ and $B_R$ or $\bar{A}_R$ and $\bar{B}_R$ to the convertor 118. The output from flip-flop 124 is also applied to cross coupling gates 116 to cross the input and output connections. Two simple examples will illustrate the need for the cross coupling gates 116. For the first example assume $A_R = \bar{A}_T$ and $B_R = B_T$. The correlators will detect $\bar{A}_u$ and $B_u$ and send representative logic signals to the decoding matrix. The matrix will generate an INVERT A control signal which will pass through cross coupling gates 116 and toggle flip-flop 112. The change in output from flip-flop 112 reverses the state of gate 100 and passes data train $\bar{A}_R$ to convertor 118.

As a second example assume that $A_R = B_T$ and $B_R = \bar{A}_T$. In this case, the A channel data is inverted and the A and B data trains are reversed. The correlators 108 and 110 will detect $B_u$ followed one bit later by $\bar{A}_u$. The decoding matrix will generate REVERSE A & B and INVERT A control signals. Flip-flop 124 will be toggled causing a reversal of the data channels at the output of convertor 118. The A channel data, which must be inverted to be correct, is passing through gate 102 rather than gate 100 and thus the INVERT A control signal must toggle flip-flop 114 rather than flip-flop 112, as in the prior case. This is taken care of by cross coupling gates 116. The switching of flip flop 124 causes a reversal in the connections between the two input terminals and the two output terminals of cross coupling gates 116. In the latter case the INVERT A control signal will pass through gates 116 to the output which is connected to flip-flop 114.

Any convenient means, such as a short delay at the inputs to cross coupling gates 116 may be provided to insure that the cross coupling gates are locked in the proper input/output connections prior to the INVERT control signals being applied thereto.

Figure 6:
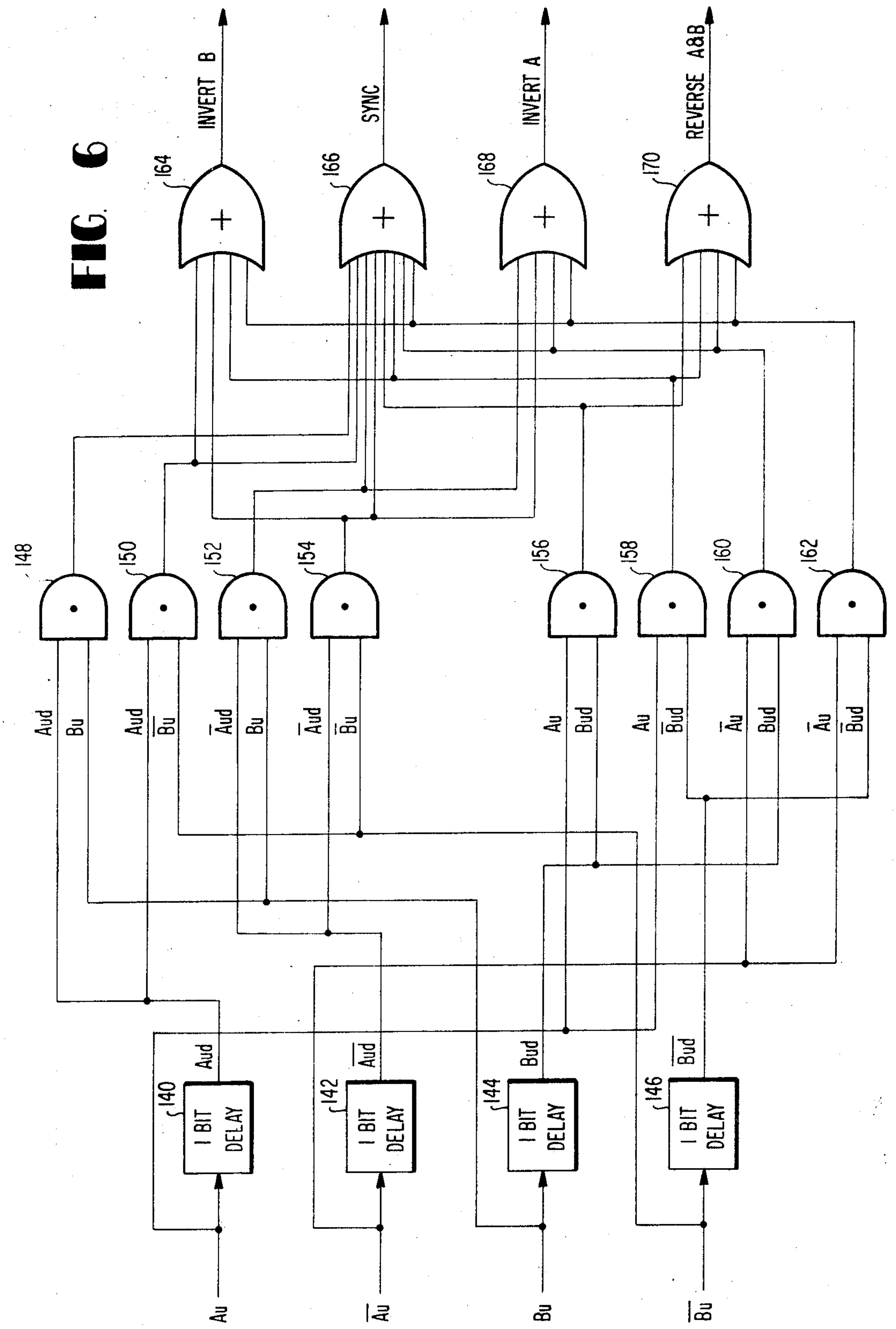
FIG. 6 is a block diagram of a decoding matrix which forms a part of the system of FIG. 5.

A simple example of a decoding matrix 128 which responds to the logic outputs from correlators 108 and 110 and their relative time of occurrence to generate the control signals described is shown in FIG. 6. The embodiment comprises one-bit delay lines, 140 – 146, AND gates 148 – 168, and OR gates 164 – 170. The subscript D in the drawing indicates a delay of one bit time. The logic is self explanatory.

What is claimed is:

1. In a four phase PSK communications link of the type in which two channels of transmit data are modulated onto phase quadrature related carriers and thereafter combined to form a quadraphase modulated carrier, and which further includes means for deriving two channels of receive data from said quadraphase modulated carrier, the improvement comprising, a. first means connected to said first receive channel for detecting whether the data in said first receive channel corresponds to the true or complement form of the data in said first or second transmit channels, and for providing output signals indicating the results of said detection, b. second means connected to said second receive channel for detecting whether the data in said second receive channel corresponds to the true or complement form of the data in said first or second transmit channels, and for providing output signals indicating the results of said detection, and c. means responsive to the outputs from said first and second detecting means for altering the data in said receive channels so that it is the same as the data in said transmit channels.

2. The invention as claimed in claim 1, wherein said means for altering comprises, a. first invertor means responsive to said first detecting means for inverting the data from said first receive channel when said first receive channel data corresponds to the complement of data in either of said transmit channels, and b. second invertor means responsive to said second detecting means for inverting the data from said second receive channel when said second receive channel data corresponds to the complement of data in either of said transmit channels.

3. The invention as claimed in claim 2, wherein said means for altering further comprises channel data reversing means responsive to said first and second detecting means for reversing the data in said receive data channels when the data in said first and second receive channels corresponds to the true or complement of the data in said second and first transmit channels respectively.

4. The invention as claimed in claim 3, wherein the improvement further comprises means for inserting a first unique word into said first transmit channel and means for inserting a second unique word into said second transmit channel, whereby said first and second unique words modulate said quadrature related carriers.

5. The invention as claimed in claim 4, wherein said first detecting means comprises, a. a first shift register storage means connected to receive data serially from said first receiver channel, b. a first correlator connected to said shift register for correlating the shift register contents with said first unique word and providing output signals indicating the presence of said first unique word or its complement in said first shift register, and c. a second correlator connected to said shift register for correlating the shift register contents with said second unique word and providing output signals indicating the presence of said second unique word or its complement in said first shift register.

6. The invention as claimed in claim 5, wherein said second detecting means comprises, a. a second shift register storage means connected to receive data serially from said second receive channel, b. a third correlator connected to said shift register for correlating the shift register contents with said first unique word and providing output signals indicating the presence of said first unique word or its complement in said second shift register, and c. a fourth correlator connected to said shift register for correlating the shift register contents with said second unique word and providing output signals indicating the presence of said second unique word or its complement in said second shift register.

7. In a four phase PSK communications link of the type in which two parallel channels of transmit data, derived from a single transmit serial data train are modulated onto phase quadrature related carriers and thereafter combined to form a quadraphase modulated carrier, and which further includes means for deriving two channels of receive data from said quadraphase modulated carrier, the improvement comprising, a. means for modulating a first unique word of bit length N on one of said quadrature related carriers,
b. means for simultaneously modulating a second unique word of bit length N on the other of said quadrature related carriers,
c. parallel to serial converter means connected to receive data trains from said first and second receive channels and for combining said data trains to form a serial data train by interlacing the data bits in said data trains,
d. a shift register storage means of length 2N connected to receive said serial data train,
e. means connected to said shift register for generating control signals in response to said unique words or their complements appearing in alternate bit positions of said shift register, and
f. means responsive to said control signals for altering the data forming said serial data train to conform to said single transmit serial data train.

8. The invention as claimed in claim 7, wherein said means for generating control signals comprises, a. first correlator means having N inputs connected to N alternate stages of said shift register for correlating the contents of said N alternate stages with said first unique word and providing an indication of whether said contents corresponds to said first unique word or its complement, and
b. second correlator means having N inputs connected to N alternate stages of said shift register for correlating the contents of said N alternate stages with said second unique word and providing an indication of whether said contents corresponds to said second unique word or its complement.

9. The invention as claimed in claim 8, wherein said means for generating control signals further comprises decoding matrix means responsive to said indications from said first and second correlators for generating a. a first control signal when said first correlator indicates the presence of the complement of said first unique word,
b. a second control signal when said second correlator indicates the presence of the complement of said second unique word, and
c. a third control signal when the indications from said first and second correlators indicate that the true or complement of said second unique word is interlaced with and preceeds the true or complement of said first unique word in said shift register.

10. The invention as claimed in claim 9, wherein said means for altering comprises, a. first invertor means responsive to said first control signals for inverting one of said two channels of receive data prior to application of said receive data to said convertor means,
b. second invertor means responsive to said second control signal for inverting the other of said two channels of said receive data prior to application of said receive data to said convertor means, and
c. means responsive to said third control signal and connected to said convertor for reversing the order of interlacing the data from said two receive channels.

11. The invention as claimed in claim 9 wherein said means for altering comprises, a. a first invertor gate means connected between the first receive channel and said convertor, and having two possible states, for gating the data from said first channel through to said convertor, with or without inversion depending on the state thereof,
b. a second invertor gate means connected between the second receive channel and said convertor, and having two possible states, for gating the data from said second cnannel through to said convertor, with or without inversion depending on the state thereof,
c. first bistable means responsive to a control signal applied thereto for changing the state of said first invertor means,
d. second bistable means responsive to a control signal applied thereto for changing the state of said second invertor means,
e. cross coupling means connected between said control signal generating means and said first and second bistable means, said cross coupling means having a first state wherein it couples said first control signal to said first bistable means and said second control signal to said second bistable means and a second state wherein it couples said first control signal to said second bistable means and said second control signal to said first bistable means, said cross coupling means being responsive to said third control signal for changing its state, and
f. means responsive to said third control signal and conneced to said convertor for reversing the order of interlacing said data trains.

* * * * *